United States Patent [19]

Hofmann et al.

[11] Patent Number: 5,490,732

[45] Date of Patent: Feb. 13, 1996

[54] WHEEL BEARING HUB WITH DEFORMED BEAD

[75] Inventors: Henrich Hofmann, Schweinfurt; Roland Langer, Schwanfeld; Vasilis Hassiotis, Niederwerrn, all of Germany

[73] Assignee: FAG Kugelfischer Georg Schafer AG, Germany

[21] Appl. No.: 337,957

[22] Filed: Nov. 10, 1994

[30] Foreign Application Priority Data

Nov. 23, 1993 [DE] Germany ............. 43 39 847.2

[51] Int. Cl.$^6$ ............................................. F16C 33/60
[52] U.S. Cl. ............................. 384/537; 384/543
[58] Field of Search .......................... 384/544, 543, 384/537, 585, 559

[56] References Cited

U.S. PATENT DOCUMENTS

| | | | |
|---|---|---|---|
| 3,583,511 | 6/1971 | Asberg | 384/544 X |
| 4,848,938 | 7/1989 | Haas et al. | 384/543 X |
| 4,887,917 | 12/1989 | Tröster et al. | 384/543 |
| 5,061,090 | 10/1991 | Kriaski et al. | 384/537 |
| 5,226,738 | 7/1993 | Valette et al. | 384/537 X |
| 5,240,333 | 8/1993 | Hassiotis et al. | 384/537 X |

*Primary Examiner*—Thomas R. Hannon
*Attorney, Agent, or Firm*—Ostrolenk, Faber, Gerb & Soffen

[57] ABSTRACT

A wheel bearing unit for example for use in a motor vehicle, including an antifriction bearing clamped on the hub. The hub includes a bore which defines a tubular hub part that prior to deformation extends past the axially outer end of the inner ring of the bearing. The tubular hub part is deformed radially outward around the radially inner, axially outer edge of the inner ring to clamp the inner ring and the bearing to the hub. Features of the inner ring and hub for enabling such clamping are disclosed including the hub material hardness, the hub having a tubular part of a particular wall thickness and a length protruding beyond the axial end of the bearing, the radius of the edge of the inner ring about which the bead is formed, the thickness of the bead and its angle of inclination both with reference to the end of the inner ring and to the interior bore, and the depth of the bore.

8 Claims, 2 Drawing Sheets

WHEEL BEARING HUB WITH DEFORMED BEAD

BACKGROUND OF THE INVENTION

The present invention relates to a wheel bearing unit for motor vehicles particularly to the hub thereof and more particularly to shaping of the hub to clamp on a bearing.

A wheel bearing for motor vehicles is disclosed for example in Federal Republic of Germany OS 39 20 299. That wheel bearing requires the material of the inner ring of the bearing, which is provided with a bead, to have two contrary properties. The material must be capable of being hardened to obtain its bearing property and be plastically deformable to permit attachment. This requires an expensive heat treatment process, for example, case hardening. The same disadvantage also applies to a bearing disclosed in EP-OS 0 475 792 in which the bead is produced by expensive thermoforming.

In addition, if the bearing rings are developed as separate parts (as in FIG. 6 of EP-OS 0 475 792), there can be a problem that the geometry of the bearing rings can be affected by the shape of the bead with the result that the hub can be damaged. Therefore, the bearing rings must be provided with an initial stress which is sufficient but not too high.

SUMMARY OF THE INVENTION

The object of the invention is to improve on a bearing unit that avoids the above disadvantages by developing a reliable and inexpensive attachment and clamp for the bearing rings on the hub.

The invention concerns a wheel bearing unit preferably for a motor vehicle and comprising a hub, an antifriction bearing on the hub with the inner ring or rings of the bearing on the hub, and a wheel on the outer ring of the hub. The antifriction bearing typically has two rows of rolling elements and typically has a respective inner ring for each row. The inner rings may be pressed on the hub, with the last positioned inner ring capable of falling off the hub unless clamped there. The invention concerns clamping at least one of the inner rings and specifically the last applied inner ring to fix it axially on the hub. A bead is formed on the end of the hub by plastic deformation of the end of the barrel of the hub after the ring to be clamped has been placed on the hub.

In order to permit the tubular barrel of the hub to be deformed plastically to define the bead, the hub and the inner ring to be clamped should have at least some, and preferably all, of the following features. The material of the hub, at least at the portion of the hub which is the tubular barrel that is to be plastically deformed, has a hardness in the range of 200 to 270 HB. The barrel of the hub is deformed around the axially outer, radially inner edge of the bearing inner ring being clamped, and the radius curve of the radially inner, axially outer edge of the inner ring is in the range of 2–4 mm. The radius of curvature of the bead where the barrel is deformed around the edge of the inner ring is in the range of 5–8 mm. At its thickest, where the bead is deformed around the edge of the inner ring, the bead has an axial height beyond the end of the inner ring of 4.0–6.0 mm. From that point of greatest height around the edge of the inner ring, as the bead extends radially outward along the axially outer edge of the inner ring, the bead gradually tapers narrower in its thickness at an angle in the range of 20°–30° from the radially outward direction. The barrel of the hub is hollow and a tubular bore, at least up to and preferably slightly past the transition of the hub to the inner ring to be clamped. As the hub passes into the bore of the hub where the barrel of the hub is bent radially outward around the axially outer, radially inner edge of the inner ring, and the radial interior of the hub, in the direction axially in from the inner edge of the inner ring, is at an angle of inclination of 0°–20° to the axial direction. Preferably, the bead is at least 8 mm from the transition between the radius and the rim.

Preferably, the hub barrel has a wall thickness in the range of 4.5–6.0 mm and has a length which protrudes beyond the axial end of the inner ring of the bearing in the range of 10 to 14 mm.

The bead may be formed by a cold forming process or by a rivet forming process, both of which are known processes.

It has been found that the geometry of the bead is independent of the diameter of the bearing and applies also to practically all types of bearings. Only a mere distinction in the shaping of the hub need be made between a solid hub with a bore into its end and a fully hollow hub.

Other features and advantages of the present invention will become apparent from the following description of the invention which refers to the accompanying drawings.

DETAILED DESCRIPTION OF THE INVENTION

Figure 1:
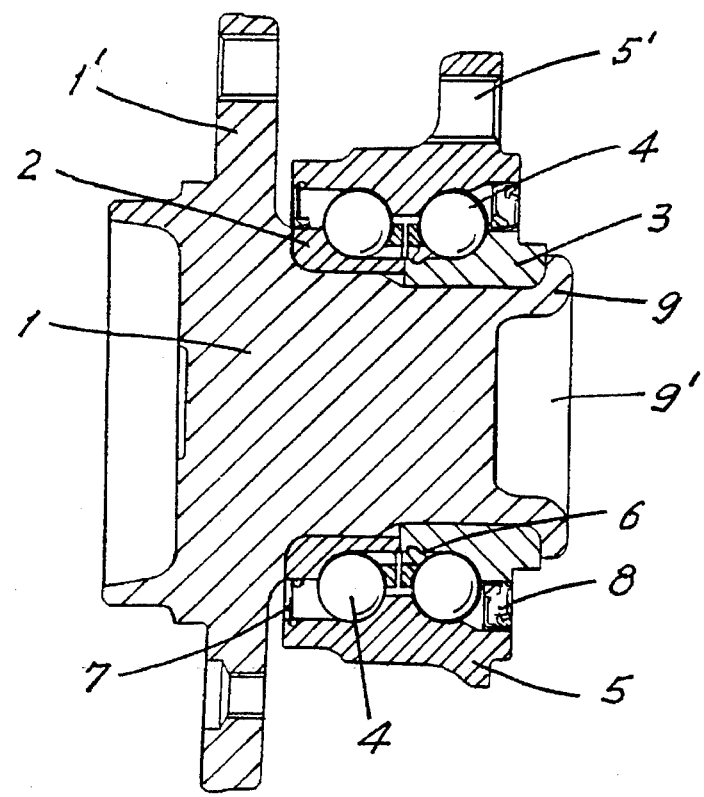
FIG. 1 is a longitudinal cross section through a wheel bearing unit in accordance with the invention and having a solid hub.
Figure 2:
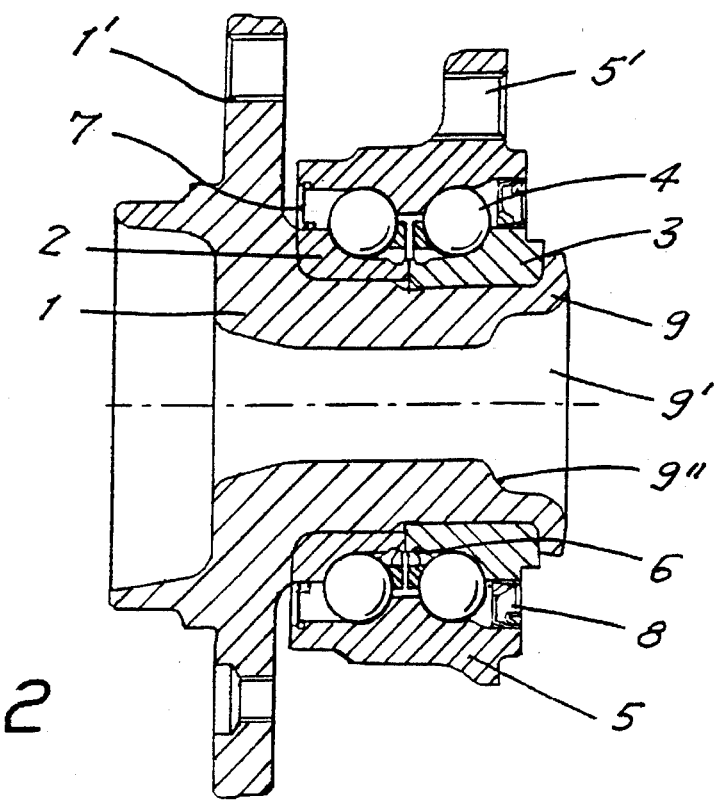
FIG. 2 is a longitudinal cross section through a wheel bearing unit in accordance with the invention and having a hollow hub.

In FIGS. 1 and 2, the hub 1 has a fastening flange 1'. Inner rings 2 and 3 are pushed onto the hub 1. Together with the two axially neighboring rows of rolling bodies 4 and the single piece outer ring 5 outside the inner rings, these elements together form a wheel bearing. The two rows of rolling bodies and the rolling bodies within each row are held apart by a respective separator 6 in each row. Furthermore, the wheel bearing is also protected from entrance of dirt by packings 7 and 8.

In modern wheel bearings, the packing 8 is generally developed such that the outer sealing ring can also serve as an impulse ring for measuring the speed of rotation of the bearing. The outer ring 5 is also provided with an attachment flange 5' for a wheel.

In FIG. 1, the hub is shown formed as a solid hub, while in FIG. 2, the hub is shown formed as a hollow hub. Axial fastening and clamping of the inner rings 2 and 3 on the hub 1 is effected by the plastically deformed bead 9 on the axial end of the hub beyond the inner ring 3.

Figure 3:
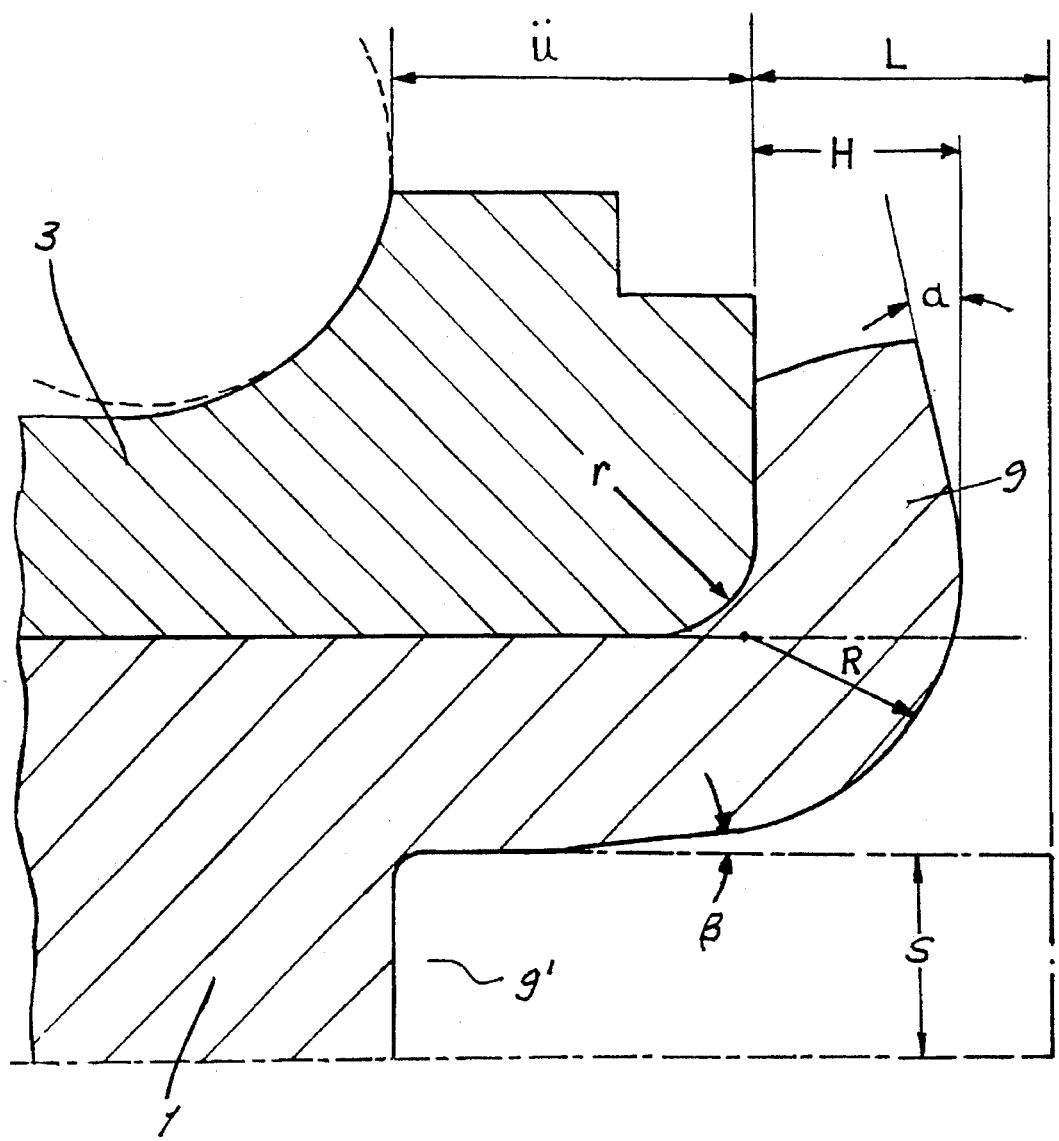
FIG. 3 is a cross section showing an enlarged portion of the bearing unit in the region of the bead.

As can be noted from FIG. 3, the initially undeformed hub barrel 10, which is shown in dashed line, extends about 10 to 14 mm axially beyond the end of the inner ring 3.

Upon a subsequent roll riveting process which is effected at room temperature, or by a cold forming, the hub barrel 10 is deformed to produce the bead 9. This clamps the inner rings 2, 3 against each other and fixes the bearing 2–5 axially on the hub 1.

To properly clamp the bearing 2–5 together with the hub 1, the entire hub 1, or at least that tubular portion of the hub 1 that is deformed to form the bead 9, is comprised of a desirable deformable material, e.g. steel having a core hardness of 200 to 270 HB, a radius r of the edge of the inner ring 3, the bead radius R around that edge, and the wall thickness S and the protrusion length L of the barrel 10 of the hub are selected.

Particularly good results are obtained with r=2.5

R=6 mm

S=5 mm, and

L=12 mm.

Referring to FIG. 3, it is seen that the length of radius r and the location of the radially radius R are such that this edge is tangent to the surface of the inner ring bore through which hub 1 extends. With the foregoing; geometry of the hub barrel 10 and inner ring 3, after the roll riveting process, the upturned (radially outward) part of the barrel, which defines the bead 9, has a height (H) of 5 mm at the edge of the inner ring, followed by an upward inclination α of 23° from the axially outer side of the bead 9. The hub barrel 10 passes into the hub bore 9' with an inclination β of 15° to the radially outer side of the barrel 10.

In the solid hub of FIG. 1, the hub bore at 9' has a depth extending at least up to the transition between the inner radius and the hub. In the case of the hollow hub, this applies in corresponding manner for the shoulder 9".

It has been found that the foregoing bead geometry is independent of the diameter of the bearing and applies to practically all types of bearings. Therefore, whether such wheel bearings are designed for use in a small car or for use in large truck wheel bearings, e.g. with tapered-roller bearings, the wheel bearings can be cold formed using the same roll riveting machine. This is of great advantage from the standpoint of manufacture.

In addition to being substantially simpler from a manufacturing standpoint, as compared with the traditional solutions, as in wheel bearings with hub nuts, or the like, the bearing unit of the invention is lighter and more reliable.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing unit comprising:

a wheel hub having an axial end;

an angular antifriction bearing around the hub including at least one inner ring on the hub, at least one row of bearing rolling elements around the inner ring, and an outer ring outside the inner ring;

the inner ring being installable on the hub by being movable axially onto the end of the hub, and the inner ring having an axially outer end;

the hub including a tubular end portion extending axially beyond the axially outer end of the inner ring, and the hub end portion being deformed plastically to extend radially outwardly for defining a bead over the axially outer end of the inner ring to clamp the installed inner ring on the hub;

the hub bore being at an angle of inclination (β) in the range of 0° to 20° with reference to the radially inner edge of the inner ring;

at least the portion of the hub defining the bead having a hardness in the range of 200 to 270 HB;

the inner ring of the bearing having an axially outer, radially inner rounded edge around which the bead is formed and the radius (r) of that edge of the inner ring is in the range of 2–4 mm;

the bead being deformed around the radially inner, axially outer edge of the inner ring, the bead has a bead curvature radius (R) in the range of 5–8 mm;

at the radially inner, axially outer edge of the inner ring, the bead has an axial height (H) in the range of 4.0–6.0 mm and wherein radially outwardly, the bead tapers narrower and has an axially outer side that is inclined and an angle (α) in the range of 20°–30° from the radial direction of the axially outer edge of the inner ring.

2. The wheel bearing of claim 1, wherein after the bead is formed by deforming the hub, the hub has a bore in from its axial end which has a depth at least up to the transition between the hub and the inner ring.

3. The wheel bearing of claim 2, wherein the bead is at least 8 mm from the transition.

4. The wheel bearing of claim 2, wherein before it is deformed to define the bead, the tubular hub around the hub bore has a wall thickness in the range of 4.5–6.0 mm and the tubular hub has a length protruding axially beyond the end of the inner ring of the bearing in the range of 10–14 mm.

5. The bearing unit of claim 4, wherein the initially undeformed hub barrel has a wall thickness of 5 mm and a length extending axially beyond the axial end of the inner ring of 12 mm, the radius of the radially inner, axially outer edge of the inner ring is 2.5 mm, the bead radius of the bead around the edge of the inner ring is 6 mm, the height of the bead at the edge of the inner ring is 6 mm, the bead inclines at an angle of 23° to the axially outer end of the inner ring after the bead is formed, the bead is 10 mm from the transition, and the hub barrel has an angle of inclination, with reference to the radially inner side of the inner ring, of 15° into the hub bore.

6. The bearing unit of claim 1, wherein the bead is formed on the hub around the edge of the inner ring by cold forming.

7. The bearing unit of claim 1, wherein the bead is formed on the hub around the edge of the inner ring by a roll riveting process.

8. The wheel bearing of claim 1 in which the wheel hub extends through a bore of the inner ring, said rounded edge around which said bead is formed being tangent to a surface of said inner ring that defines said bore.

\* \* \* \* \*